United States Patent
Kang et al.

(10) Patent No.: US 9,918,230 B2
(45) Date of Patent: Mar. 13, 2018

(54) METHOD OF PERFORMING SECURE COMMUNICATION, SYSTEM-ON-CHIP PERFORMING THE SAME AND MOBILE SYSTEM INCLUDING THE SAME

(71) Applicant: SAMSUNG ELECTRONICS CO., LTD., Suwon-si, Gyeonggi-Do (KR)

(72) Inventors: Myung-Hee Kang, Hwaseong-si (KR); Jung-Tae Kim, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/373,632

(22) Filed: Dec. 9, 2016

(65) Prior Publication Data

US 2017/0195884 A1  Jul. 6, 2017

(30) Foreign Application Priority Data

Dec. 31, 2015  (KR) .................. 10-2015-0190898

(51) Int. Cl.
*H04W 12/06* (2009.01)
*H04W 12/08* (2009.01)
*H04L 29/06* (2006.01)

(52) U.S. Cl.
CPC ............ *H04W 12/08* (2013.01); *H04L 63/10* (2013.01); *H04L 63/101* (2013.01); *H04W 12/06* (2013.01)

(58) Field of Classification Search
CPC ..... H04L 63/20; H04L 67/22; G06F 17/2247; G06F 21/6263; G06Q 30/0645; G06Q 30/0609; G06Q 20/18; G08B 21/18; H04M 1/72572; H04W 4/021

USPC ...................... 370/338; 455/411; 726/22, 26; 340/573.2; 705/3; 707/10
See application file for complete search history.

(56) References Cited

U.S. PATENT DOCUMENTS

| | | | |
|---|---|---|---|
| 7,734,647 B2 | 6/2010 | Suhonen et al. | |
| 8,195,816 B2 | 6/2012 | Yamasaki et al. | |
| 8,560,728 B2 | 10/2013 | Dunk | |
| 8,752,140 B1 | 6/2014 | Paczkowski et al. | |
| 9,077,769 B2 | 7/2015 | Krzeminski et al. | |
| 2008/0060054 A1 | 3/2008 | Srivastava | |
| 2012/0110321 A1 | 5/2012 | Splitz et al. | |
| 2015/0058929 A1 | 2/2015 | Ayyagari et al. | |
| 2015/0121516 A1 | 4/2015 | Korkishko et al. | |
| 2015/0135283 A1 | 5/2015 | Tofighbakhsh | |
| 2016/0092699 A1* | 3/2016 | Riva .................. | H04L 67/306 726/26 |
| 2016/0180080 A1* | 6/2016 | Heldt-Sheller ......... | G06F 21/57 726/22 |

FOREIGN PATENT DOCUMENTS

| | | |
|---|---|---|
| KR | 10200090017306 | 2/2009 |
| KR | 10-0904311 | 6/2009 |

* cited by examiner

*Primary Examiner* — Phuoc H Doan
(74) *Attorney, Agent, or Firm* — F. Chau & Associates, LLC

(57) ABSTRACT

In a method of performing secure communication, access information for navigating to a target site is received while a mobile system is in a normal mode. An operational mode of the mobile system is changed from the normal mode to a secure mode based on the access information. The access information is verified while the mobile system is in the secure mode. Access to the target site is either allowed or denied based on a result of the verification.

20 Claims, 18 Drawing Sheets

METHOD OF PERFORMING SECURE COMMUNICATION, SYSTEM-ON-CHIP PERFORMING THE SAME AND MOBILE SYSTEM INCLUDING THE SAME

CROSS-REFERENCE TO RELATED APPLICATION

This application claims priority under 35 USC § 119 to Korean Patent Application No. 10-2015-0190898, filed on Dec. 31, 2015 in the Korean intellectual Property Office (KIPO), the contents of which are herein incorporated by reference in their entirety.

TECHNICAL FIELD

The present invention relates to a communication method, and more particularly to methods of performing secure communication in mobile systems, system-on-chips (SOCs) performing the methods, and mobile systems including the SOCs.

DISCUSSION OF THE RELATED ART

Mobile electronic devices, such as smart phones, laptop/notebook computers, and tablet computers, are commonly used to conduct various transactions, such as financial transactions, that are highly sensitive. These transactions generally occur over a wireless communication network, such as WiFi, though which the transactions may be performed over the Internet. In addition to financial transactions, mobile electronic devices may also be used for such transactions as mobile shopping, and mobile information searches, to name but a few. The mobile electronic devices can access various applications and/or sites (e.g., websites) for the private transactions. As more people are participating in mobile transactions, greater attention is being paid to the need for increased security to combat malicious attacks. One form of malicious attack makes use of redirection, by which a user attempting to access an official website is redirected to a malicious website, where the user may unwittingly reveal login credentials. Such computer attacks are referred to as pharming attacks.

SUMMARY

At least one exemplary embodiment of the present disclosure provides a method of performing secure communication capable of increasing security in a mobile system.

At least one exemplary embodiment of the present disclosure provides a system-on-chip (SOC) capable of increasing security in a mobile system including the SOC.

At least one exemplary embodiment of the present disclosure provides a mobile system including the SOC.

According to an exemplary embodiment of the present invention, in a method of performing secure communication, access information for a target site is received in a normal mode. An operational mode of the mobile system is changed from the normal mode to a secure mode based on a reception of the access information. A verification step is performed on the access information in the secure mode. The target site is selectively accessed based on a result of the verification step.

According to an exemplary embodiment of the present invention, a system-on-chip (SOC) includes a processor core, a memory connected to the processor core, and an interface unit connected to the processor core. The memory stores instructions executed by the processor core to change an operational mode of the SOC from a normal mode to a secure mode based on a reception of access information for a target site when the access information is received in the normal mode. A verification step is performed on the access information in the secure mode. The target site is selectively accessed based on a result of the verification step. The interface unit controls access to the target site.

According to exemplary embodiments of the present invention, a mobile system includes a system-on-chip (SOC) and a plurality of functional modules controlled by the SOC. The SOC includes a processor core, a memory connected to the processor core, and an interface unit connected to the processor core. The memory stores instructions executed by the processor core to change an operational mode of the SOC from a normal mode to a secure mode. The change of the operational mode is based on a reception of access information for a target site when the access information is received in the normal mode. A verification step is performed on the access information in the secure mode. The target site is selectively accessed based on a result of the verification. The interface unit controls access to the target site.

According to exemplary embodiments of the present invention, a computer-readable medium stores executable instructions that, in response to execution, cause a system including a processor to perform secure communication. In the secure communication, access information for a target site is received in a normal mode. An operational mode of the mobile system is changed from the normal mode to a secure mode based on a reception of the access information. A verification is performed on the access information in the secure mode. The target site is selectively accessed based on a result of the verification.

In the method of performing the secure communication according to exemplary embodiments of the present invention, a system-on-chip (SOC) may operate based on the method. When the mobile system attempts to access the target site, the operational mode may be changed from the normal mode to the secure mode, and then the access information may be verified in the secure mode. The target site may be accessed only when the verification has succeeded. Accordingly, pharming attacks may be efficiently prevented, and the user's personal information may be efficiently protected. Additionally, the mobile system may be prevented from being used as part of a denial of service (DOS) attack. Therefore, the SOC and the mobile system may have increased security.

BRIEF DESCRIPTION OF THE DRAWINGS

Illustrative, non-limiting exemplary embodiments of the present invention will be more clearly understood from the following detailed description taken in conjunction with the accompanying drawings, in which.

DETAILED DESCRIPTION OF THE EMBODIMENTS

Figure 1:
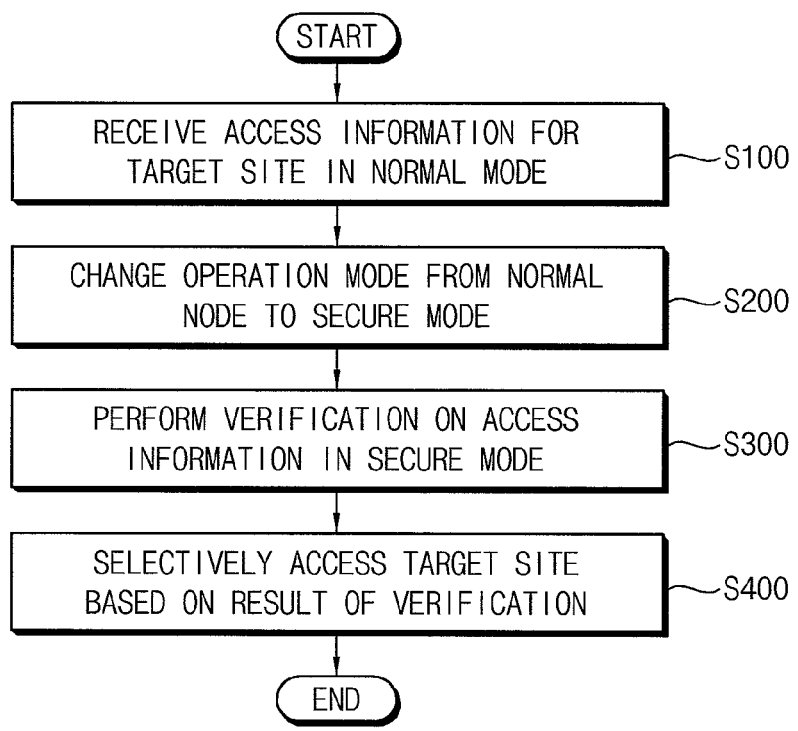
FIG. 1 is a flow chart illustrating a method of performing secure communication in a mobile system according to exemplary embodiments of the present invention.

Various exemplary embodiments of the present invention will be described more fully with reference to the accompanying drawings. The present disclosure may, however, be embodied in many different forms and should not be construed as limited to the embodiments set forth herein. Like reference numerals may refer to like elements throughout this application.

FIG. 1 is a flow chart illustrating a method of performing secure communication in a mobile system according to exemplary embodiments of the present invention.

Referring to FIG. 1, in a method of performing the secure communication in the mobile system according to exemplary embodiments of the present invention, access information for a target site (e.g., a website) is received in a normal mode (step S100), and an operational mode of the mobile system is changed from the normal mode to a secure mode based on a reception of the access information (step S200). The access information may include an address and a port number for accessing the target site. For example, the address may be provided as an internee protocol (IP) address, a domain name, etc. The normal mode may be referred to as a non-secure mode or a non-trusted execution mode, and the secure mode may be referred to as a trusted execution mode.

A verification is performed on the access information in the secure mode (step S300), and the target site is selectively accessed based on a result of the verification (step S400). For example, access to the target site may be permitted if verification is successful while access to the target site may be blocked if the verification fails. The steps S300 and S400 are described in greater detail below with reference to FIGS. 6 through 17.

In a method of performing secure communication in a mobile system according to exemplary embodiments of the present invention, the access information for the target site may be verified when the mobile system attempts to access the target site. Particularly, the operational mode of the mobile system may be changed from the normal mode to the secure mode, and then the access information may be verified in the secure mode. The mobile system may be permitted to access the target site only when the verification has been successfully performed, while in the secure mode. Accordingly, pharming attacks may be efficiently prevented, user's personal information may be efficiently protected, and the mobile system may have an increased level of security.

Figure 2:
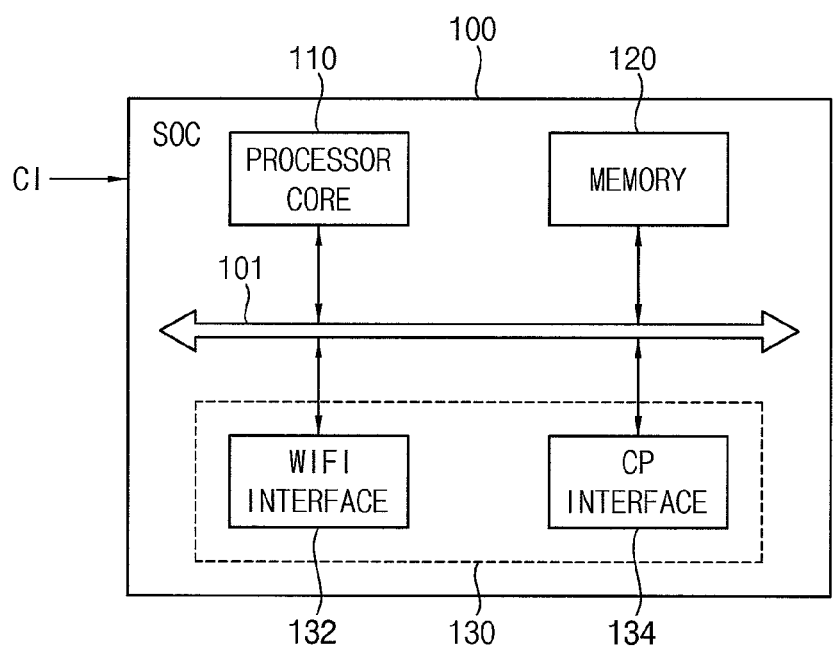
FIG. 2 is a block diagram illustrating a system-on-chip (SOC) according to exemplary embodiments of the present invention.

FIG. 2 is a block diagram illustrating a system-on-chip (SOC) according to exemplary embodiments of the present invention.

Referring to FIG. 2, an SOC 100 includes a processor core 110, a memory 120 and an interface unit 130. The SOC 100 may further include a bus 101. Some elements of the SOC 100 are not illustrated in FIG. 2 for convenience of illustration and are described in detail below with reference to FIG. 3.

In some exemplary embodiments of the present invention, the SOC 100 may be included in any mobile system. and the SOC may be a central processing unit (CPU), a microprocessor, an application processor (AP), etc.

The processor core 110 may be responsible for controlling overall operations of the SOC 100. For example, the processor core 110 may be used to perform various computational functions such as particular calculations and tasks, may execute an operating system (OS) to drive the mobile system, and may execute various applications such as providing an internet browser, executing a game, displaying a video file, controlling a camera module, etc.

In some exemplary embodiments of the present invention, as will be described with reference to FIG. 5, the processor core 110 may be driven based on a secure OS and a normal OS (e.g. a non-secure OS). The SOC 100 and the mobile system including the SOC 100 may operate in the secure mode based on the secure OS and may operate in the normal mode based on the normal OS.

In some exemplary embodiments of the present invention, the processor core 110 may include a single processor core or a plurality of processor cores. For example, the processor core 110 may be implemented with a multi-core structure. The multi-core structure may be a dual-core structure, a quad-core structure, a hexa-core structure, etc. In some exemplary embodiments of the present invention, the processor core 110 may further include a cache memory that is located inside or outside the processor core 110.

The memory 120 stores data and/or instructions that are processed and/or executed by the processor core 110. For example, the memory 120 may store a boot image for booting the mobile system, a file system for the OS to drive the mobile system, a device driver for an external device connected to the mobile system, and/or an application executed on the mobile system. For example, the memory 120 may include at least one of a volatile memory and a nonvolatile memory. The volatile memory may function as a system memory, while the nonvolatile memory may function as storage memory.

The interface unit 130 communicates with an external device. The interface unit 130 may include a first interface unit 132 and a second interface unit 134. The first interface unit 132 may communicate with an external device (e.g., an external WiFi module) based on WiFi communications protocols. The second interface unit 134 may communicate with an external device (e.g., an external communication processor) based on a wireless mobile communication, such as 3G, 4G, a long term evolution (LTE), etc. Thus the first interface unit 132 may be responsible for providing a connection to a personal Internet connection, a workplace Internet connection, or a WiFi hotspot, while the second interface unit 134 may be responsible for providing a connection to a cellular/mobile phone network provider.

The SOC 100, according to exemplary embodiments of the present invention. may be implemented to operate based on a method of performing the secure communication, as described herein. For example, the memory 120 may be used to store instructions that are executed by the processor core 110 to change an operational mode of the SOC 100 from the normal mode to the secure mode based on the reception of access information CI for the target site when the access information CI is received in the normal mode. The memory may further store executable instructions for the processing core 110 to perform verification on the access information CI in the secure mode and to selectively access the target site based on the result of the verification. The processor core 110 is connected to the memory 120 and the interface unit 130 via the bus 101 and the processor core 110 controls an execution of the instructions. The interface unit 130 controls access to the target site.

Figure 3:
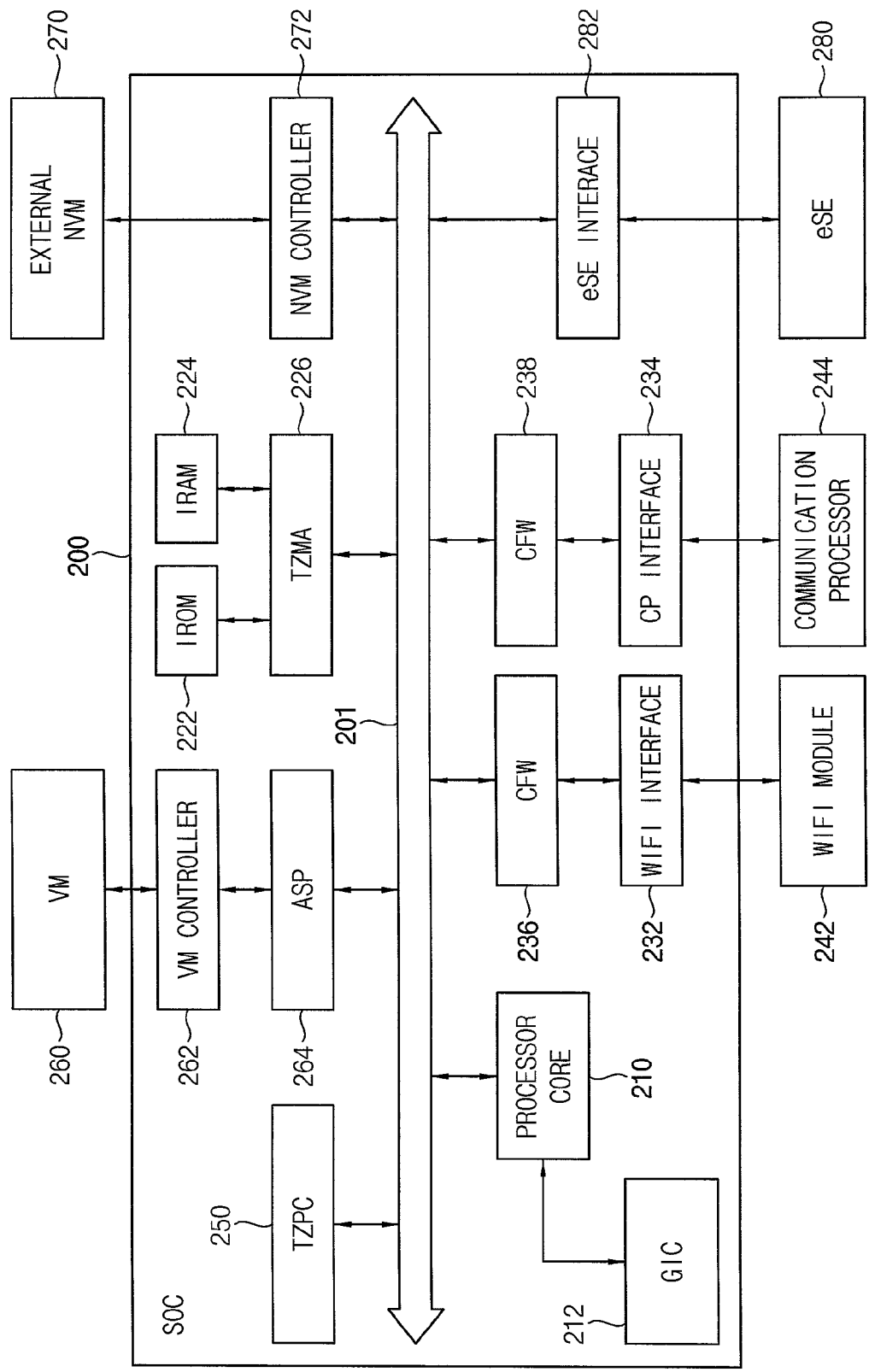
FIG. 3 is a block diagram illustrating a mobile system including the SOC according to exemplary embodiments of the present invention.

FIG. 3 is a block diagram illustrating a mobile system including the SOC according to exemplary embodiments of the present invention.

Referring to FIG. 3, a mobile system may include an SOC 200, a WiFi module 242, a communication processor 244, a volatile memory 260, a nonvolatile memory 270 and an embedded secure element (eSE) 280.

The SOC 200 may control overall operations of the mobile system. The SOC 200 may include a processor core 210, an interrupt controller (e.g., a generic interrupt controller (GIC)) 212, a protection controller (e.g., a trustzone protection controller (TZPC)) 250, a first internal memory (IROM) 222, a second internal memory (IRAM) 224, a memory adapter (e.g., a trustzone memory adapter (TZMA)) 226, a first interface unit (e.g., a WiFi interface unit) 232, a second interface unit (e.g., a communication processor (CP) interface unit) 234, a first contents firewall (CFW) 236, a second CFW 238, a first memory controller 262, an address space protector (ASP) 264, a second memory controller 272, a third interface unit (e.g., an eSE interface unit) 282 and a bus 201.

The processor core 210 may be substantially the same as the processor core 110 in FIG. 2. The processor core 210 may be connected to other elements (e.g., various hardware elements) via the bus 201. For example, the processor core 210 may be an ARM processor core, and the bus 201 may be an AMBA (advanced microcontroller bus architecture, or ARM main memory bus architecture) bus.

The interrupt controller 212 may be responsible for setting secure properties of all of interrupt resources in the SOC 200. For example, the interrupt controller 212 may divide interrupts into secure interrupts and normal interrupts. The secure interrupts may be referred to as trusted interrupts or fast interrupt requests (FIQ). The normal interrupts may be referred to as non-secure interrupts, non-trusted interrupts or interrupt requests (IRQ). The secure properties of the interrupt resources might only be settable while in the secure mode. The secure interrupts may be processed while in the secure mode, and the normal interrupts may be processed while in the normal mode.

The protection controller 250 may set secure properties of all of hardware resources (e.g., all elements) in the SOC 200. For example, the protection controller 250 may divide hardware resources (e.g., elements) into first hardware resources for the secure mode and second hardware resources for the normal mode. Such secure properties of the hardware resources might only be set in the secure mode and might not be set in the normal mode. The first hardware resources may operate exclusively in the secure mode, and the second hardware resources may operate exclusively in the normal mode. In some exemplary embodiments of the present invention, a single hardware resource may be included among both the first and second hardware resources. For example, a single hardware resource may operate in both the secure and normal modes.

The first internal memory 222 and the second internal memory 224 may be substantially the same as the memory 120 in FIG. 2. For example, the first internal memory 222 may include at least one nonvolatile memory, and the second internal memory 224 may include at least one volatile memory.

The memory adapter 226 may be interoperable with the protection controller 250 and may divide a storage region in the second internal memory 224 into a secure region and a non-secure region. Such division of the storage region might only be performed while in the secure mode.

The first interface unit 232 and the second interface unit 234 may be substantially the same as the first interface unit 132 and the second interface unit 134 in FIG. 2, respectively. For example, the first interface unit 232 may connect the SOC 200 with the WiFi module 242 such that the SOC 200 communicates with the WiFi module 242 based on WiFi communications protocols. The second interface unit 234 may connect the SOC 200 with the communication processor 244 such that the SOC 200 communicates with the communication processor 244 based on wireless mobile communications protocols.

The first and second CFWs 236 and 238 may control accesses to the hardware resources in the SOC 200 and may prevent leakage of information while in the secure mode. For example, the first CFW 236 may control access from the WiFi module 242 when the SOC 200 exchanges data with the WiFi module 242. The second CFW 238 may control access from the communication processor 244 when the SOC 200 exchanges data with the communication processor 244.

The first memory controller 262 may control the volatile memory 260 that is disposed outside the SOC 200. For example, the volatile memory 260 may include at least one volatile memory, such as a dynamic random access memory (DRAM), a synchronous DRAM (SDRAM), a static random access memory (SRAM), etc.

The ASP 264 may divide a storage region in the volatile memory 260 into a secure region and a non-secure region and may control access to the volatile memory 260.

The second memory controller 272 may control the nonvolatile memory 270 that is disposed outside the SOC 200. For example, the nonvolatile memory 270 may include at least one nonvolatile memory, such as an electrically erasable programmable read-only memory (EEPROM), a flash memory, a phase-change random access memory (PRAM), a resistance random access memory (RRAM), a magnetic random access memory (MRAM), a ferroelectric random access memory (FRAM), a nano floating gate memory (NFGM), and/or a polymer random access memory (PoRAM), etc. The nonvolatile memory 270 may be implemented with an embedded multimedia card (eMMC), a universal flash storage (UFS), etc.

The third interface unit 282 may connect the SOC 200 with the eSE 280 such that the SOC 200 exchanges data with the eSE 280. In the secure mode, the SOC 200 may execute various secure applications for financial transactions, mobile shopping, etc. based on the eSE 280.

Although the WiFi communication, the wireless mobile communication and the eSE communication are described as examples of interfaces supported by the SOC 200 of FIG. 3, interfaces supported by the SOC 200 are not limited thereto. For example, the SOC 200 may include various elements for performing communications according to various types of protocols such as universal serial bus (USB), Ethernet, near field communication (NFC), radio frequency identification (RFID), GSM, GPRS, WCDMA, HSxPA, etc.

Figure 4:
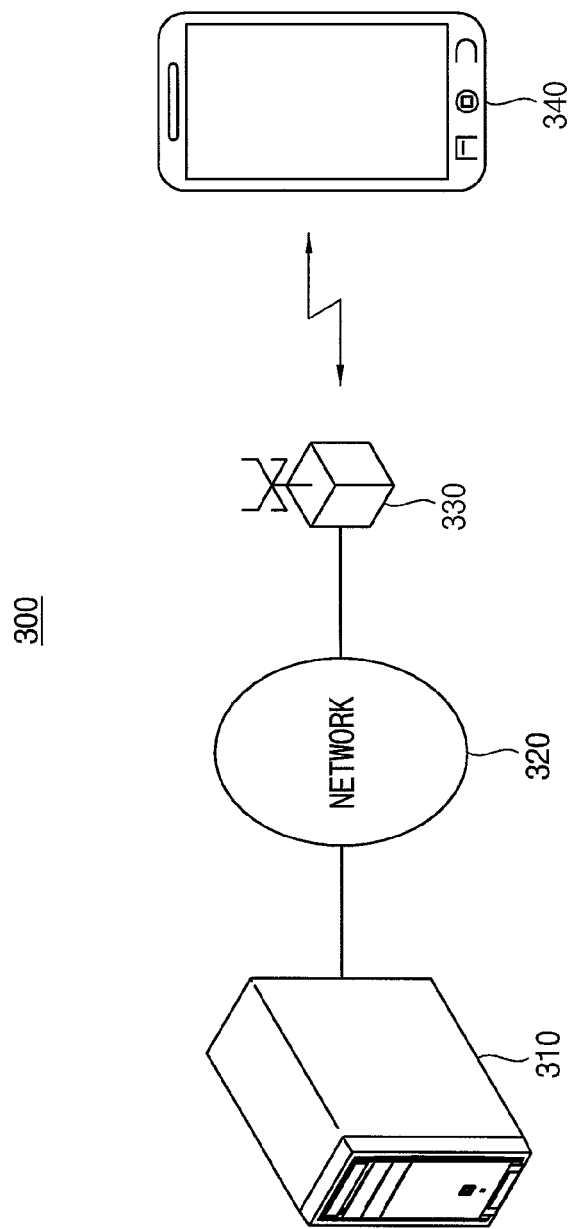
FIGS. 4 and 5 are diagrams illustrating the method of performing the secure communication in the mobile system according to exemplary embodiments of the present invention.
Figure 5:
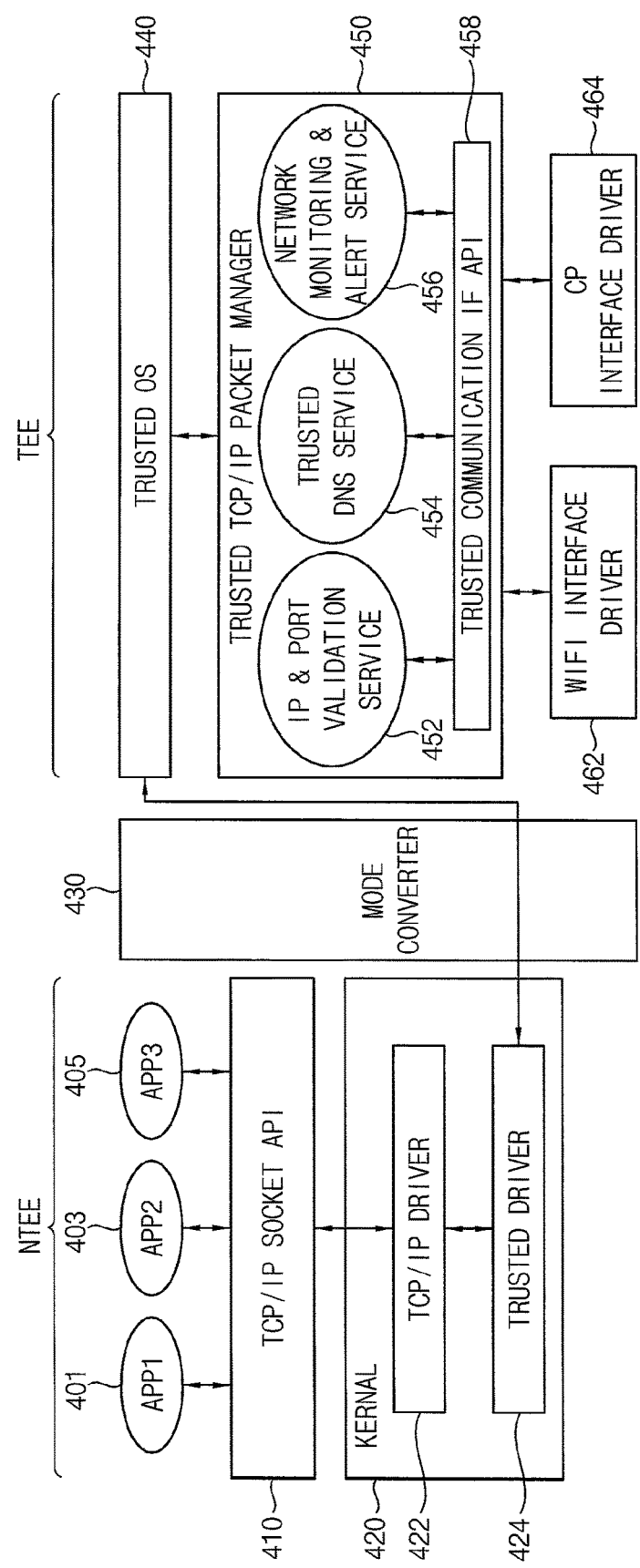

FIGS. 4 and 5 are diagrams illustrating methods for performing secure communication in the mobile system according to exemplary embodiments of the present invention. FIG. 4 illustrates an example where the mobile system accesses the target site via a network. FIG. 5 illustrates an example of software configuration in the mobile system for performing trusted communication in the secure mode.

Referring to FIGS. 2 and 4, a system 300 may include a service provider infrastructure 310, a network 320 (e.g. wired), a base station 330 and a mobile device 340.

In the system 300, a service area for providing wireless coverage of, among other things, the target site and related content services, may be divided into a plurality of coverage cells. The base station 330 may be arranged in one of the plurality of cells as each cell may have its own corresponding base station.

The mobile device 340 may be connected to the service provider infrastructure 310 via the base station 330 and the network 320. For example, the mobile device 340 may be connected to the service provider infrastructure 310 based on WiFi communications protocols or a wireless mobile communication. The mobile device 340 may be implemented to operate with the secure communication (e.g., the method of FIG. 1) according to exemplary embodiments of the present invention and/or may be implemented to include the SOC (e.g., the SOC 200 of FIG. 2) according to exemplary embodiments of the present invention.

In some exemplary embodiments of the present invention, the mobile device 340 may be any mobile system or any portable device, such as a mobile phone, a smart phone, a tablet computer, a laptop computer, a personal digital assistants (FDA), a portable multimedia player (PMP), a digital camera, a portable game console, a music player, a camcorder, a video player, a navigation system, etc. The mobile system may further include a wearable device, an internet of things (IoT) device, an internet of everything (IoE) device, an e-book, a virtual reality (VR) device, an augmented reality (AR) device, a robotic device, etc.

Although not illustrated in FIG. 4, the mobile device 340 may be directly connected to the network 320, bypassing the base station 330.

When the mobile device 340 receives the access information CI for the target site and successfully complete the verification for the access information CI, the service provider 310 may provide the target site and the related contents services to the mobile device 340.

Hereinafter, an operation of the mobile system using a software configuration similar to the one illustrated in FIG. 5 will be described.

Referring to FIGS. 2 and 5, the mobile system may operate in either the normal mode and the secure mode. The normal mode may also be referred to as a non-trusted execution environment (NTEE), and the secure mode may also be referred to as a trusted execution environment (TEE).

The processor core 110 in the mobile system may execute a kernel 420 corresponding to a normal (non-secure) OS, and then the mobile system may operate in the NTEE. The kernel 420 may be referred to as a non-secure OS or a rich OS.

In the NTEE of the mobile system, a plurality of applications 401, 403 and 405 may be executed for providing such functions as an internet browser, a game, a video player, a camera application, etc.

When the access information CI for the target site is input by an application (e.g., an internet browser) and an input device (e.g., a keyboard, a keypad, a touch screen, etc.) in the mobile system, a socket application program interface (API) 410 may receive the access information CI, may generate an IP packet corresponding to the access information CI, and may call a driver 422 in the kernel 420. The driver 422 may be a kernel driver for processing the IP packet. The IP packet is described below with reference to FIG. 7.

To perform the verification on the IP packet corresponding to the access information CI, the operational mode of the mobile system may be changed by a trusted driver 424 and a mode converter 430. For example, the processor core 110 in the mobile system may execute a trusted OS 440, and then the mobile system may operate in the TEE. The trusted driver 424 may be a kernel driver for performing the conversion from between the NTEE and TEE modes, and the mode converter 430 may be implemented as firmware.

A trusted packet manager 450 may include a first service unit 452, a second service unit 454 and a third service unit 456. The first service unit 452 may verify validity of an IP address and a port number included in the IP packet. The second service unit 454 may request an external domain name system (DNS) server to resolve the IP address. The third service unit 456 may caution against accessing the target site. To perform the verification on the IP packet, the trusted packet manager 450 may enable at least one of the service units 452, 454 and 456.

When verification has been successfully performed, a trusted communication interface API 458 may call a WiFi interface driver 462 or a CP interface driver 464, and thus the mobile system may access the target site based on either the WiFi communication or the wireless mobile communication.

When the verification has failed, the trusted communication interface API 458 might not call the WiFi interface driver 462 and the CP interface driver 464, and thus the mobile system may block the access to the target site.

In some exemplary embodiments of the present invention, as illustrated in FIG. 5, the mobile system may perform the trusted communication based on a transmission control protocol (TCP). In this example, the socket API 410, the driver 422 and the trusted packet manager 450 may be a TCP/IP socket API, a TCP/IP driver and a trusted TCP/IP packet manager, respectively.

Although not illustrated in FIG. 5, the mobile system may perform the trusted communication based on a user datagram protocol (UDP). In this example, the socket API 410, the driver 422 and the trusted packet manager 450 may be a UDP/IP socket API, a UDP/IP driver and a trusted UDP/IP packet manager, respectively.

There are a large number of security threats that may compromise a mobile system including an SOC. For example, a user's personal information may be taken from the mobile system by installing and executing malicious applications (e.g., a malware), by illegally modifying IP packets based on hacked protocol, and/or by bypassing the DNS server.

In a method of performing the secure communication in the mobile system according to exemplary embodiments of the present invention, in the SOC operating based on the method, and in the mobile system including the SOC, an IP layer and a media access control (MAC) layer, among a plurality of TCP/IP layers, may operate in the TEE in which the trusted OS 440 is executed. Then the verification (e.g., checking the IP address and the port number, resolving the IP address, etc.) for the access information CI may be performed in the TEE. Accordingly, pharming attacks may be efficiently prevented, the user's personal information may be efficiently protected, and the mobile system may have an increased level of security.

Figure 6:
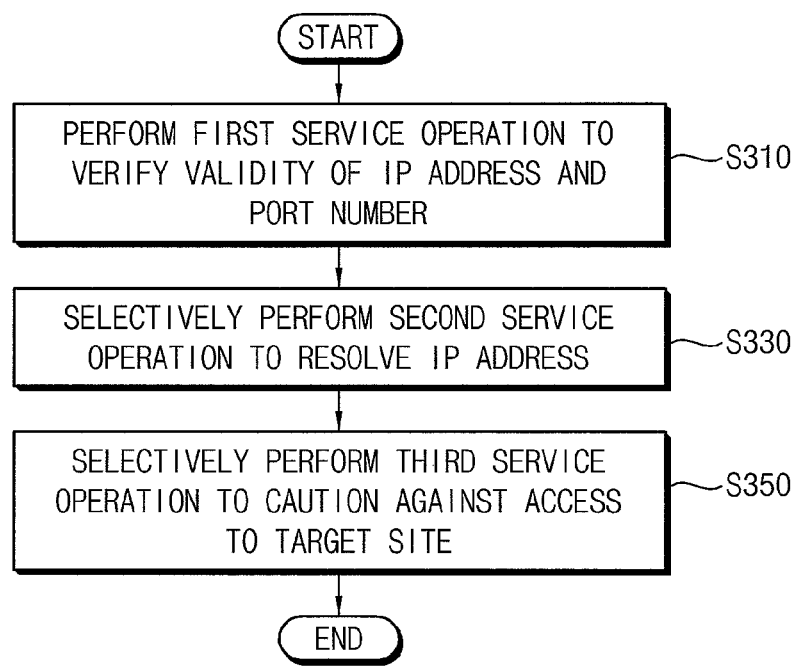
FIG. 6 is a flow chart illustrating an approach for performing a verification on access information in FIG. 1.
Figure 7:
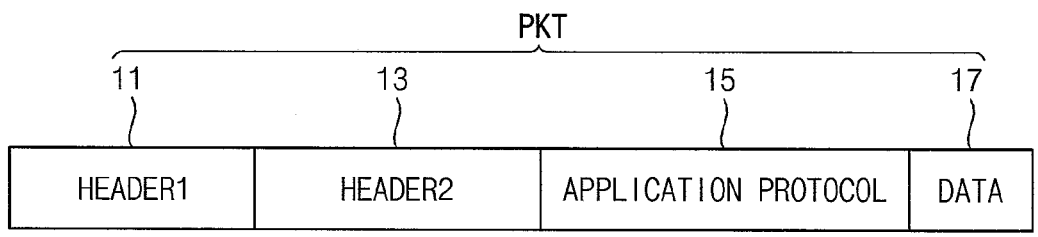
FIG. 7 is a diagram illustrating an example of an IP packet generated by a socket API in FIG. 5.

FIG. 6 is a flow chart illustrating an example for performing verification on access information as shown in FIG. 1. FIG. 7 is a diagram illustrating an example of an IP packet generated by a socket API of FIG. 5.

Referring to FIGS. 1, 2, 6 and 7, in the step S300, a first service operation may be performed to verify validity of a first IP address and a first port number included in the access information CI (step S310).

As described above with reference to FIG. 5, the socket API 410 may generate an IP packet corresponding to the access information CI. As illustrated in FIG. 7, an IP packet PKT may include headers HEADER1 11 and HEADER2 13, an application protocol 15 and data 17. For example, the header 11 may be an IP header of about 20 bytes. The header 13 may be a TCP header of about 20 bytes or a UDP header of about 8 bytes. The application protocol 15 may be a transfer protocol such as a hyper text transfer protocol (HTTP). The data 17 may be data to be transferred. The first IP address and the first port number may be obtained by analyzing the headers 11 and 13.

A second service operation may be selectively performed to resolve the first IP address based on the first port number (step S330). For example, the second service operation may be performed when the first port number satisfies (or comply with) a predetermined first condition.

A third service operation may be selectively performed to caution a user against accessing the target site (step S350). For example, the third service operation may be performed when the target site satisfies a predetermined second condition.

In some exemplary embodiments of the present invention, the first service operation, the second service operation and the third service operation may be performed by the first service unit 452, the second service unit 454 and the third service unit 456 included in the trusted packet manager 450 in FIG. 5, respectively.

In some exemplary embodiments of the present invention, at least one of the first service operation, the second service operation and the third service operation may be omitted.

Figure 8:
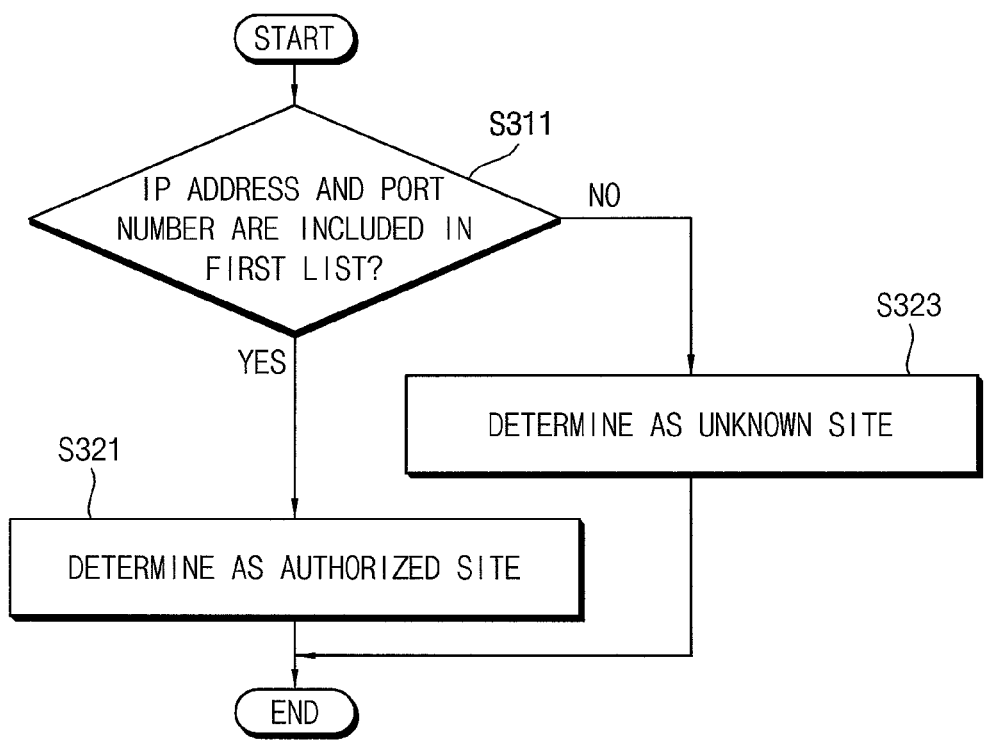
FIGS. 8 and 9 are flow charts illustrating examples of performing a first service operation in FIG. 6.
Figure 9:
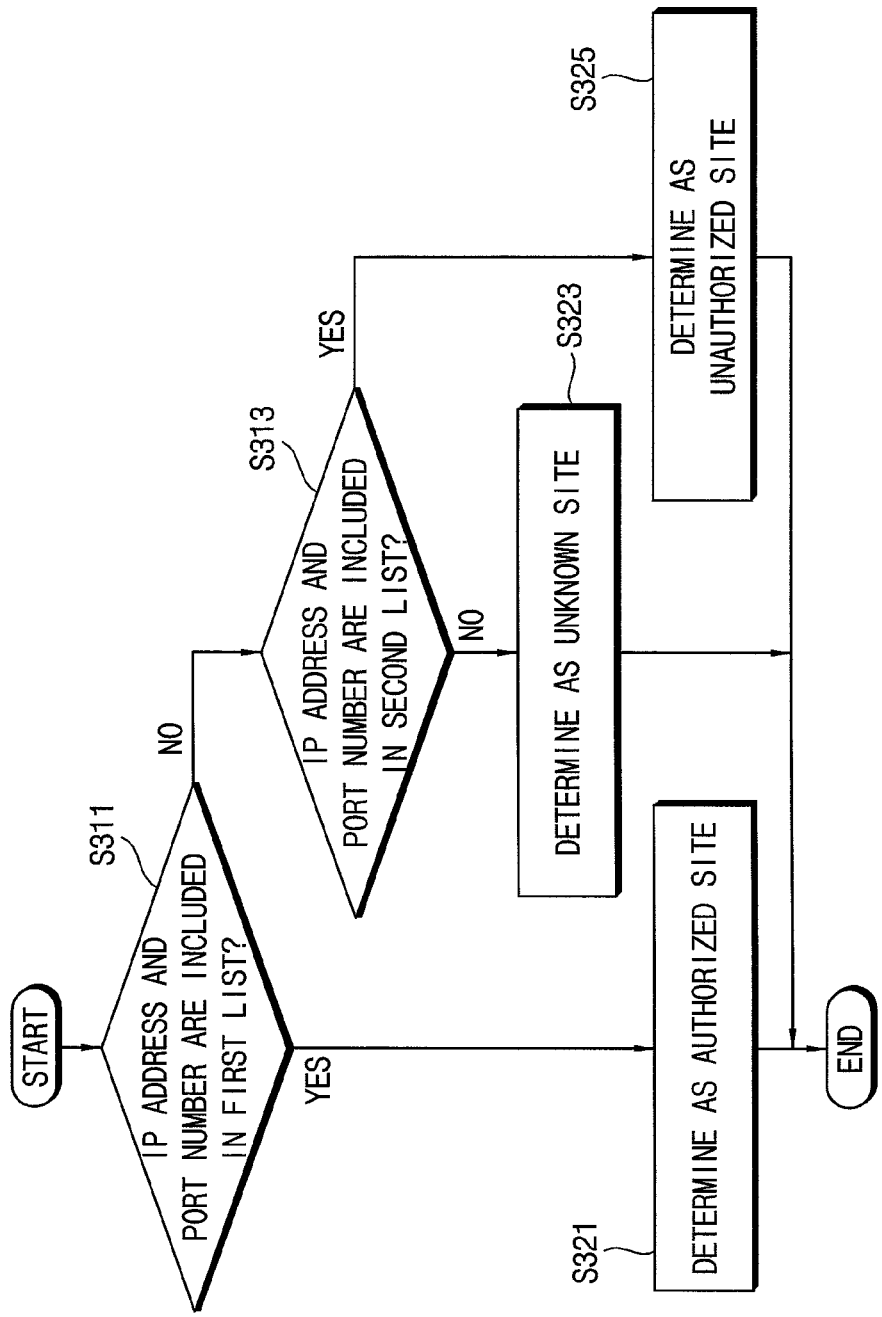

FIGS. 8 and 9 are flow charts illustrating examples of performing a first service operation shown in FIG. 6.

Referring to FIGS. 2, 6 and 8, in the steps S310, it may be checked whether the first IP address and the first port number are included in a first list that records information of authorized sites (step S311). As is described below with reference to FIGS. 15 and 16, the first list may be stored in a secure storage region of the mobile system.

When the first IP address and the first port number are included in the first list (step S311: YES), it may be determined that the target site corresponding to the first IP address and the first port number is one of the authorized sites (step S321). For example, in the step S321, it may be determined that the first IP address and the first port number are valid.

When the first IP address and the first port number are not included in the first list (step S311: NO), it may be determined that the target site is an unknown site (step S323). In this way, the list is a list of known sites where sensitive content may be accessed.

Referring to FIGS. 2, 6 and 9, in the steps S310, it may be checked whether the first IP address and the first port number are included in the first list that records the information of the authorized sites (step S311), and it may be checked whether the first IP address and the first port number are included in a second list that records information of unauthorized sites (or blocked sites) (step S313). As described below with reference to FIGS. 15 and 16, the first and second lists may be stored in the secure storage region of the mobile system.

When the first IP address and the first port number are included in the first list (step S311: YES), it may be determined that the target site corresponding to the first IP address and the first port number is one of the authorized sites (step S321).

When the first IP address and the first port number are not included in the first list (step S311: NO), and when the first IP address and the first port number are not included in the second list (step S313: NO), it may be determined that the target site is the unknown site (step S323).

When the first IP address and the first port number are not included in the first list (step S311: NO), and when the first IP address and the first port number are included in the second list (step S313: YES), it may be determined that the target site is one of the unauthorized sites (step S325). For example, in the step S325, it may be determined that the first IP address and the first port number are invalid.

Although not illustrated in FIGS. 8 and 9, the step S310 may be implemented to include the steps S313, S323 and S325, or the steps S313, S321 and S325.

Figure 10:
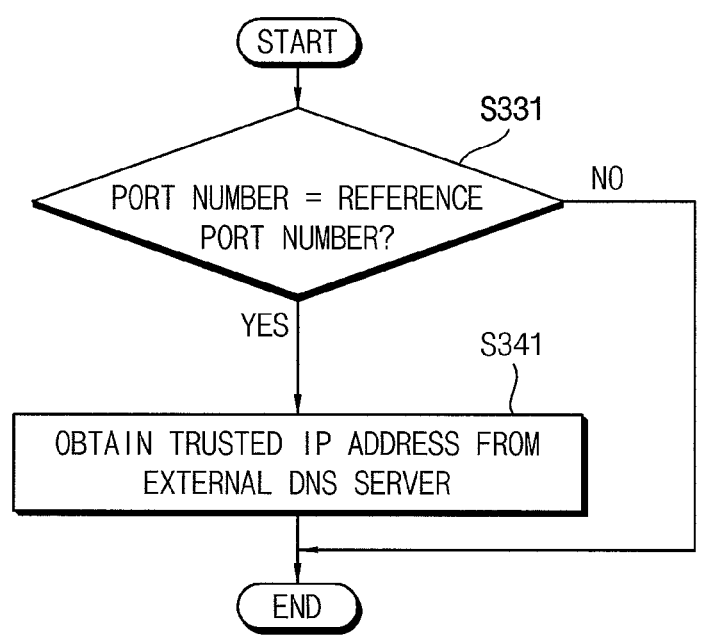
FIG. 10 is a flow chart illustrating an example of performing a second service operation in FIG. 6.

FIG. 10 is a flow chart illustrating an example of performing a second service operation in FIG. 6.

Referring to FIGS. 2, 6 and 10, in the step S330, it may be checked whether the first port number corresponds to a reference port number for accessing an external DNS server (step S331). For example, the reference port number may be 53.

As described above with reference to FIG. 1, an address included in the access information CI may be provided as an IP address or a domain name. When the address in the access information CI is provided as an IP address, the socket API 410 in FIG. 5 may generate an IP packet including the IP address itself. When the address in the access information CI is provided as a domain name, the socket API 410 in FIG. 5 may generate an IP packet including the reference port number and an IP address set based on the domain name.

When the first port number corresponds to the reference port number (step S331: YES), it may indicate that the address in the access information CI is provided as a domain name, and then a second IP address (e.g., a trusted IP address) may be obtained from the external DNS server (step S341). For example, when the address in the access information CI is provided as a domain name, a trusted DNS service may be performed in the secure mode by executing a trusted resolver and the trusted DNS service may obtain the trusted IP address for accessing the target site that is known to be legal and authorized. Accordingly, access to entrusted DNS servers will be prevented.

When the first port number does not correspond to the reference port number (step S331: NO), it may be understood that the address in the access information CI is provided as an IP address, and thus there is no necessity for performing the trusted DNS service.

Figure 11:
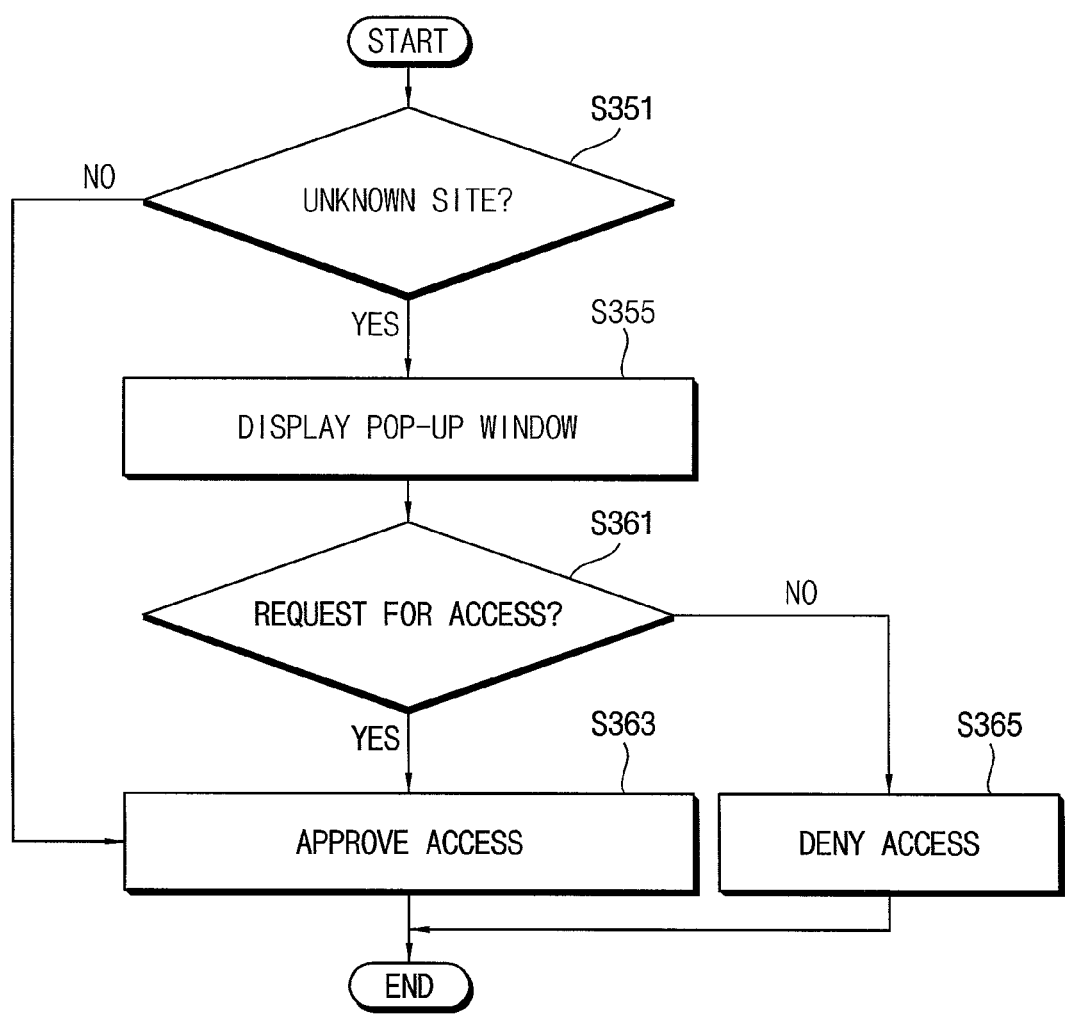
FIGS. 11 and 12 are diagrams illustrating an example of performing a third service operation in FIG. 6.
Figure 12:
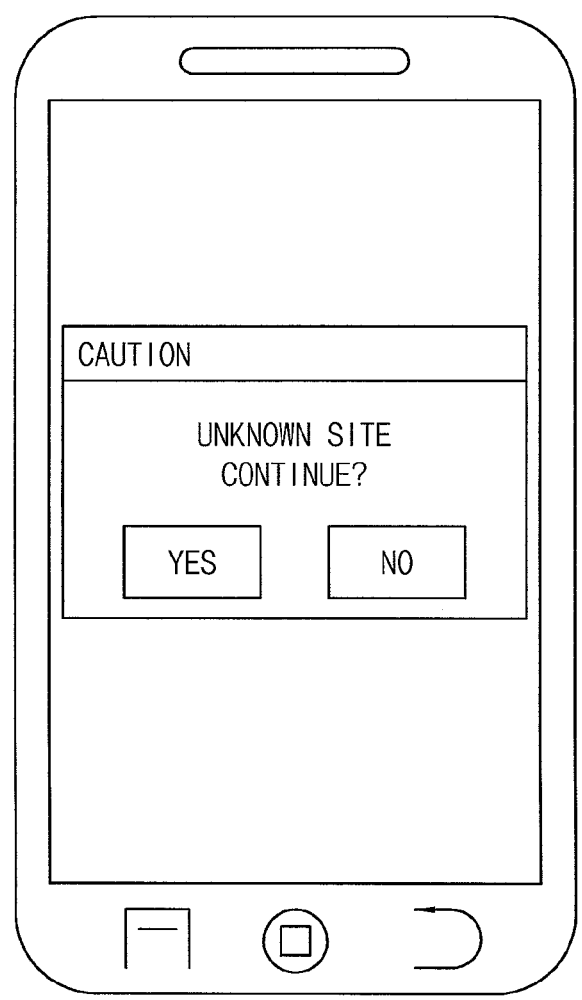

FIGS. 11 and 12 are diagrams illustrating an example of performing a third service operation in FIG. 6. FIG. 11 is a flow chart illustrating an example of performing the third service operation. FIG. 12 illustrates an example of a pop-up window displayed on the mobile system by the example of FIG. 11.

Referring to FIGS. 2, 6, 11 and 12, in the step S350, it may be checked whether the target site is a known site based on a result of at least one of the first and second service operations (step S351). For example, the known site may include one of the authorized sites that correspond to the step S321 in FIGS. 8 and 9 and/or one of sites that are already known by the user.

When the target site is a known site (step S351: NO), access to the target site may be approved without additional actions (step S363). For example, the mobile system may be permitted to access the target site.

When the target site is an unknown site (step S351: NO), a pop-up window may be displayed to inquiry whether access to the target site is to be continued (step S355). For example, as illustrated in FIG. 12, words "UNKNOWN SITE" and "CONTINUE?" may be displayed on the mobile system (e.g., on a display device in the mobile system).

When a request for access to the target site is received in response to the pop-up window (step S361: YES), e.g., when a signal corresponding to a button "YES" in FIG. 12 is received, access to the target site may be approved (step S363).

When a request for blocking the access to the target site is received in response to the pop-up window (step S361: NO), e.g., when a signal corresponding to a button "NO" in FIG. 12 is received, access to the target site may be denied (step S365).

Figure 13:
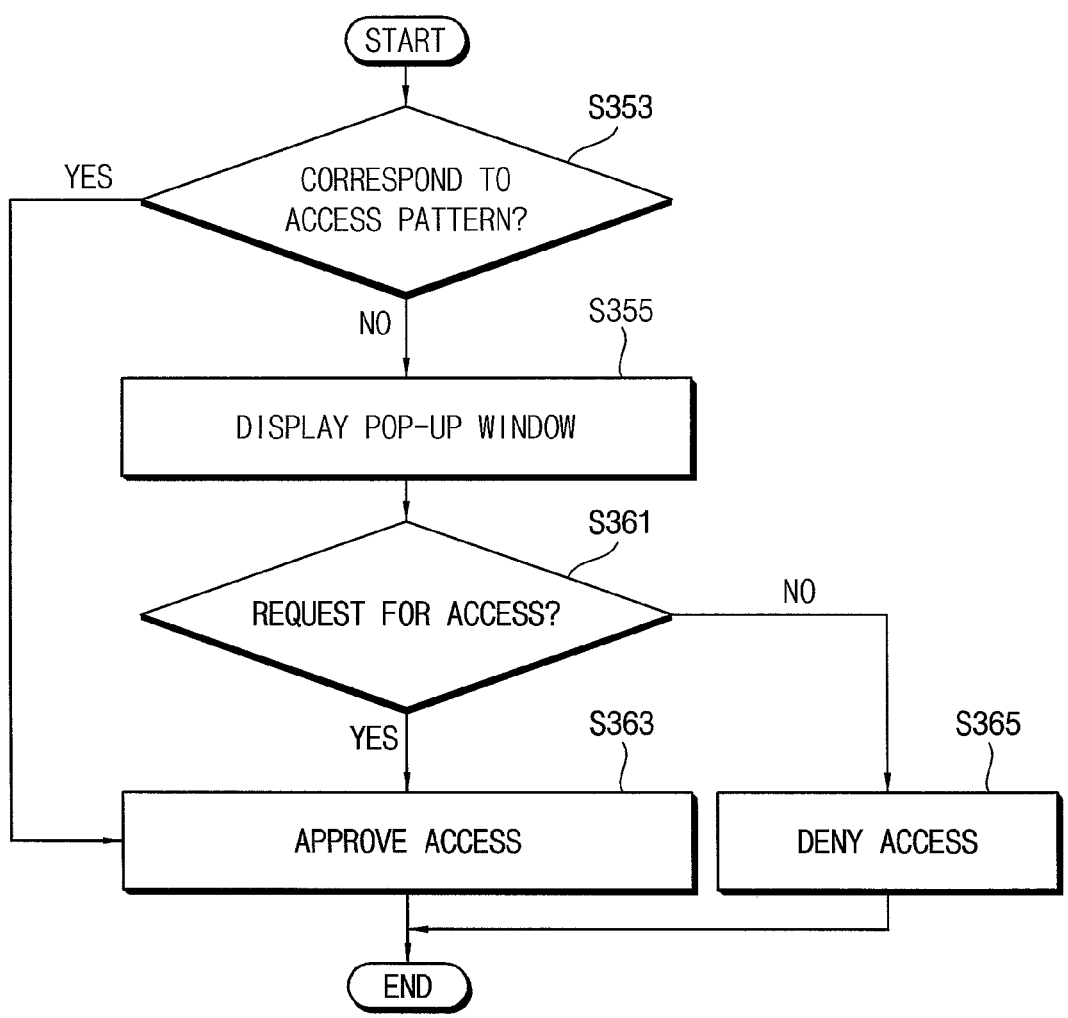
FIGS. 13 and 14 are diagrams illustrating an example of performing the third service operation in FIG. 6.
Figure 14:
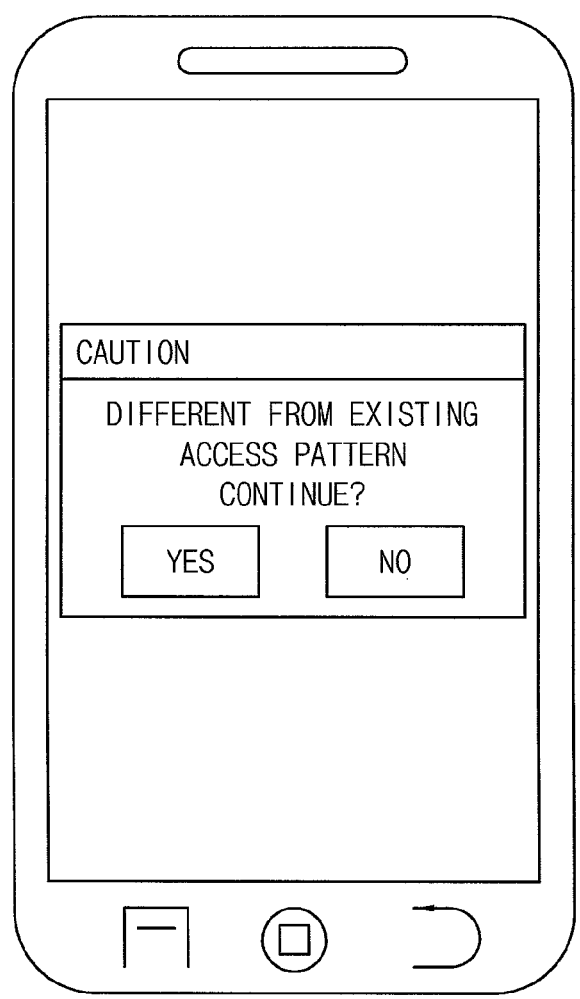

FIGS. 13 and 14 are diagrams illustrating an example of performing the third service operation in FIG. 6.

Referring to FIGS. 2, 6, 13 and 14, in the step S350, it may be checked whether the access to the target site corresponds to a predetermined first access pattern based on a result of at least one of the first and second service operations (step S353). For example, the first access pattern may include a time-based and/or a location-based access pattern, an access pattern depending on the user's tendency or characteristics, etc. As described below with reference to FIGS. 15 and 16, the first access pattern may be stored in a secure storage region of the mobile system.

When the access to the target site corresponds to the first access pattern (step S353: YES), the access to the target site may be approved without additional actions being taken (step S363).

When the access to the target site does not correspond to the first access pattern (step S353: NO), a pop-up window may be displayed to inquiry whether access to the target site is to be continued (step S355). For example, as illustrated in FIG. 14, words "DIFFERENT FROM EXISTING ACCESS PATTERN" and "CONTINUE?" may be displayed on the mobile system.

When a request for access to the target site is received in response to the pop-up window (stop S361: YES), e.g., when a signal corresponding to a button "YES" in FIG. 14 is received, access to the target site may be approved (step S363).

When a request for blocking the access to the target site is received in response to the pop-up window (step S361: NO), e.g., when a signal corresponding to a button "NO" in FIG. 14 is received, access to the target site may be denied (step S365).

Although not illustrated in FIGS. 11 and 13, the step S350 may be implemented to include all of the steps S351, S353, S355, S361, S363 and S365.

Figure 15:
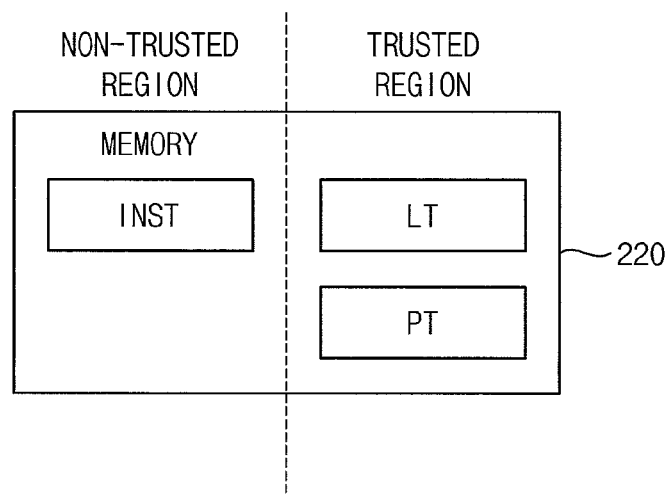
FIGS. 15 and 16 are diagrams illustrating examples where data associated with the secure communication is stored in the mobile system.
Figure 16:
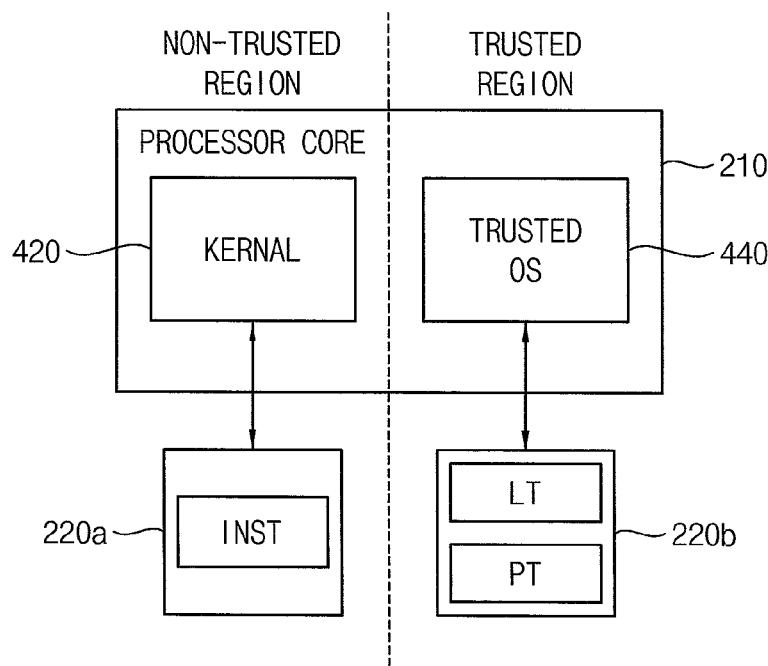

FIGS. 15 and 16 are diagrams illustrating examples where data associated with the secure communication is stored in the mobile system.

Referring to FIGS. 3 and 15, the memory 220 included in the mobile system may be divided into a secure region and a non-secure region. The secure region may be referred to as a trusted region, and the non-secure region may be referred to as a normal region or a non-trusted region.

List data LT and pattern data PT that are used for the method of performing the secure communication may be stored in the trusted region. For example, the list data LT may include the first list and the second list in FIGS. 8 and 9, and the pattern data PT may include the first access pattern in FIG. 13.

Instructions INST that are used for the method of performing the secure communication may be stored in the non-trusted region. For example, the instructions INST that are executed by the processor core 110 to change the operational mode from the normal mode to the secure mode, when the access information for the target site is received in the normal mode, to perform the verification on the access information in the secure mode, and to selectively access the target site based on the result of the verification may be stored in the non-trusted region.

Referring to FIGS. 3, 5 and 16, the processor core 210 included in the mobile system may execute the kernel 420 in a non-secure domain and may execute the trusted OS 440 in a secure domain. The non-secure domain may correspond to the normal mode (or the non-secure mode) and the NTEE. The secure domain may correspond to the secure mode and the TEE.

The list data LT and the pattern data PT that are used for the method of performing the secure communication may be stored in a trusted memory (or a secure memory) 220b. The instructions INST that are used for the method of performing the secure communication may be stored in a non-trusted memory (or a non-secure memory) 220a.

In some exemplary embodiments of the present invention, the division of the storage region described with reference to FIG. 15, and the divisions of the domain and the storage region described with reference to FIG. 16 may be performed by the protection controller 250, the memory adapter 226 and/or the ASP 264 in FIG. 3. For example, the memory 220 in FIG. 15 and the memories 220a and 220b in FIG. 16 may be the internal memories 222 and 224 in FIG. 3 or memories 260 and 270 in FIG. 3 outside of the SOC.

In some exemplary embodiments of the present invention, the data LT and PT that are used for the method of performing the secure communication may be updated based on at least one of various trusted techniques.

The security technique described with reference to FIGS. 15 and 16 may be referred to as a "TRUSTZONE" technique, as to secure integrated circuits, microprocessors and microprocessor cores.

Figure 17:
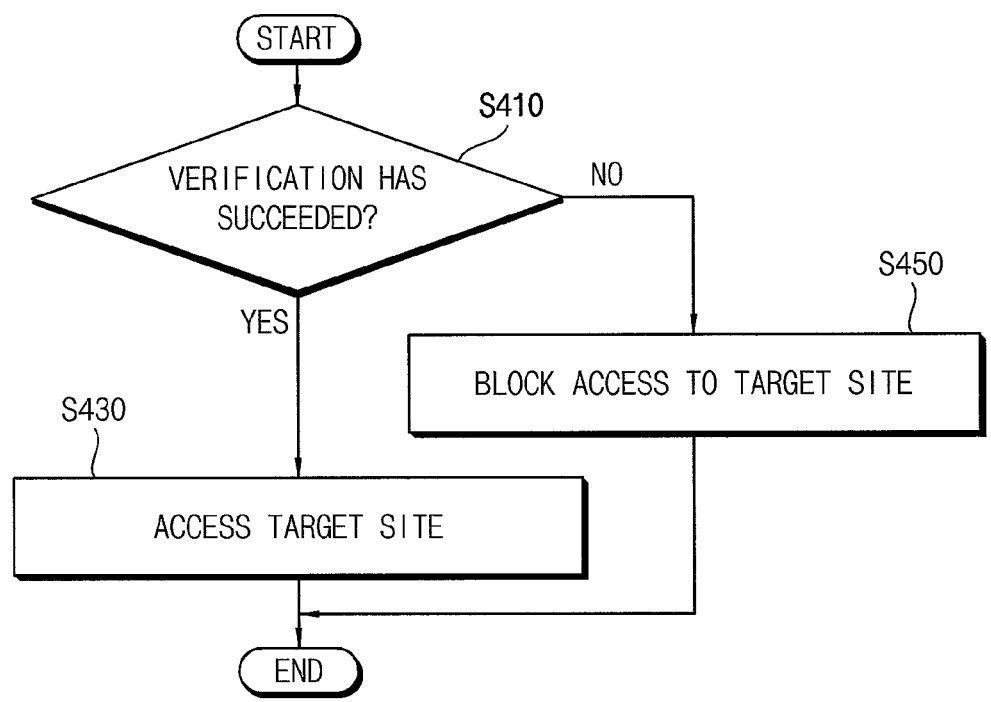
FIG. 17 is a flow chart illustrating an example of selectively accessing a target site in FIG. 1.

FIG. 17 is a flow chart illustrating an example of selectively accessing a target site in FIG. 1.

Referring to FIGS. 1, 2 and 17, in the step S400, it may be determined whether the verification has succeeded (step S410).

When the verification has succeeded (step S410: YES), the target site may be accessed (step S430). For example, when the target site is the authorized site in accordance with the examples of FIGS. 8 and 9, or when the request for the access to the target site is received in accordance with the examples of FIGS. 11 and 13, it may be determined that the verification has succeeded. In the step S430, one of the first interface unit 132 and the second interface unit 134 may be enabled, and then one of the WiFi interface driver 462 and the CP interface driver 464 may be called to access the target site.

In some exemplary embodiments of the present invention, similar to the verification, the access to the target site may be performed in the secure mode.

When the verification has failed (step S410: NO), access to the target site may be blocked (step S450). For example, when the target site is the unknown site or the unauthorized site in accordance with the examples of FIGS. 8 and 9, or when the request for blocking the access to the target site is received in accordance with the examples of FIGS. 11 and 13, it may be determined that the verification has failed.

In some exemplary embodiments of the present invention, when the verification has failed, the access information CI may be discarded.

In the method of performing the secure communication in the mobile system according to exemplary embodiments of the present invention, the SOC operating based on the method, and the mobile system including the SOC, when the mobile system attempts to access the target site, the operational mode of the mobile system may be changed from the normal mode to the secure mode, and then the access information may be verified in the secure mode. The target site may be accessed only when the verification has succeeded. Accordingly, the pharming attacks may be efficiently prevented, the user's personal information may be efficiently protected, and the mobile system may be prevented from being used as part of a denial of service (DOS) attack. Therefore, the SOC and the mobile system may have increased security.

Figure 18:
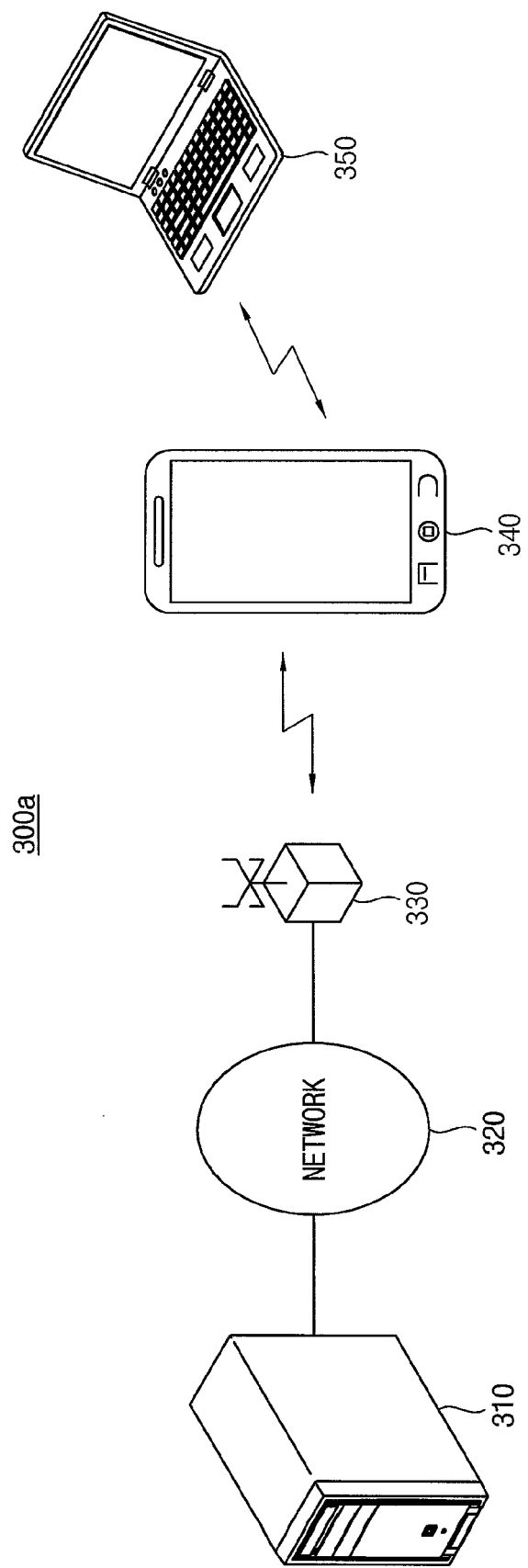
FIGS. 18 and 19 are diagrams illustrating the method of performing the secure communication in the mobile system according to exemplary embodiments of the present invention.
Figure 19:
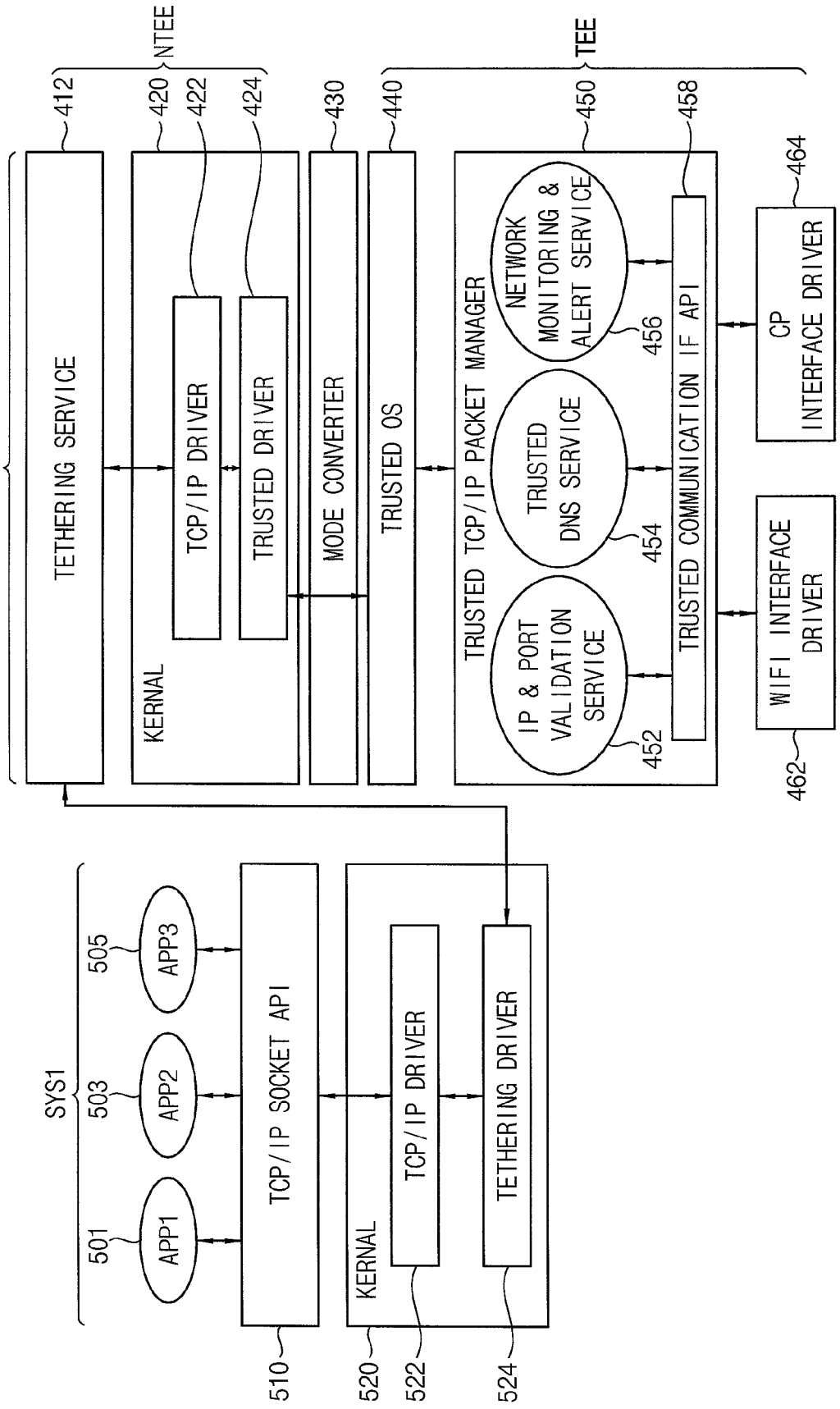

FIGS. 18 and 19 are diagrams illustrating the method of performing the secure communication in the mobile system according to exemplary embodiments of the present invention. FIG. 18 illustrates an example where the mobile system accesses the target site via the network. FIG. 19 illustrates an example of software configuration in the mobile system for performing the trusted communication in the secure mode.

Referring to FIGS. 2 and 18, a system 300a may include a service provider 310, a network 320, a base station 330, a mobile device 340 and a computing device 350.

The system 300a of FIG. 18 may be substantially the same as the system 300 of FIG. 4, except that the system 300a may further include the computing device 350 that is connected to the mobile device 340.

The computing device 350 may be connected to the service provider 310 via the mobile device 340, the base station 330 and the network 320. For example, the mobile device 340 may be connected to the computing device 350 by tethering based on a USB interface, a Bluetooth interface, and/or a WiFi interface. In this example, the access information CI for the target site may be received from the computing device 350.

The mobile device 340 may be connected to the service provider 310 based on WiFi communications protocols or a wireless mobile communication. The mobile device 340 may be implemented to operate based on the method of performing the secure communication (e.g., the method of FIG. 1) according to exemplary embodiments of the present invention and/or may be implemented to include the SOC (e.g., the SOC 200 of FIG. 2) according to exemplary embodiments of the present invention.

In some exemplary embodiments of the present invention, the computing device 350 may be any computing system, such as a personal computer (PC), a server computer, a workstation, a tablet computer, a laptop computer, a mobile phone, a smart phone, a PDA, a PMP, a digital camera, a digital television, a set-top box, a music player, a portable game console, a navigation device, etc. In other exemplary embodiments of the present invention, the computing device 350 may any mobile system similar to the mobile device 340.

Hereinafter, an operation of the mobile system and the computing system is described based on an example of the software configuration illustrated in FIG. 19.

Referring to FIGS. 2 and 19, a computing system SYS1 may operate in any operational mode, and a mobile system SYS2 may operate in either the normal mode or the secure mode.

The computing system SYS1 may execute a kernel 520. The processor core 110 in the mobile system SYS2 may execute the kernel 420, and then the mobile system SYS2 may operate in the NTEE.

The computing system SYS1 may be connected to the mobile system SYS2 by the tethering. For example, the mobile system SYS2 may execute a tethering service 412, and the computing system SYS1 may call a tethering driver 524 in the kernel 520 for connecting to the tethering service 412. For example, the tethering driver 524 may include at least one of a USB tethering driver, a bluetooth tethering driver and a WiFi tethering driver.

In the computing system SYS1, a plurality of applications 501, 503 and 505 may be executed for providing an interact browser, a game, a video player, a camera application, etc. When the access information CI for the target site is input by an application and an input device in the computing system SYS1, a socket API 510 may generate an IP packet corresponding to the access information CI and may call a driver 522 in the kernel 520.

The mobile system SYS2 may receive the IP packet via the tethering driver 524 and the tethering service 412. The tethering service 412 may call the driver 422 in the kernel 420.

To perform the verification on the IP packet corresponding to the access information CI, the operational mode of the mobile system SYS2 may be changed by the trusted driver 424 and the mode converter 430, and then the mobile system SYS2 may operate in the TEE.

The trusted packet manager 450 may enable at least one of the service units 452, 454 and 456 to perform the verification on the IP packet. When the verification has succeeded, the computing system SYS1 may access the target site via the mobile system SYS2. When the verification has failed, the computing system SYS1 and/or the mobile system SYS2 may block the access to the target site.

In the example of FIG. 19, operations of verifying the access information CI and selectively accessing the target site may be substantially the same as the operations described with reference to FIGS. 6 through 17.

In the method of performing the secure communication in the mobile system according to exemplary embodiments of the present invention, the SOC operating based on the method, and the mobile system including the SOC, when the computing system connected to the mobile system based on the tethering attempts to access the target site, the operational mode of the mobile system may be changed from the normal mode to the secure mode, and then the access information may be verified in the secure mode. The target site may be accessed only when the verification has succeeded. Accordingly, pharming attacks may be efficiently prevented, the user's personal information may be efficiently protected, and the mobile system may be prevented from participating in a DOS attack. Therefore, the SOC and the mobile system may have increased security.

Figure 20:
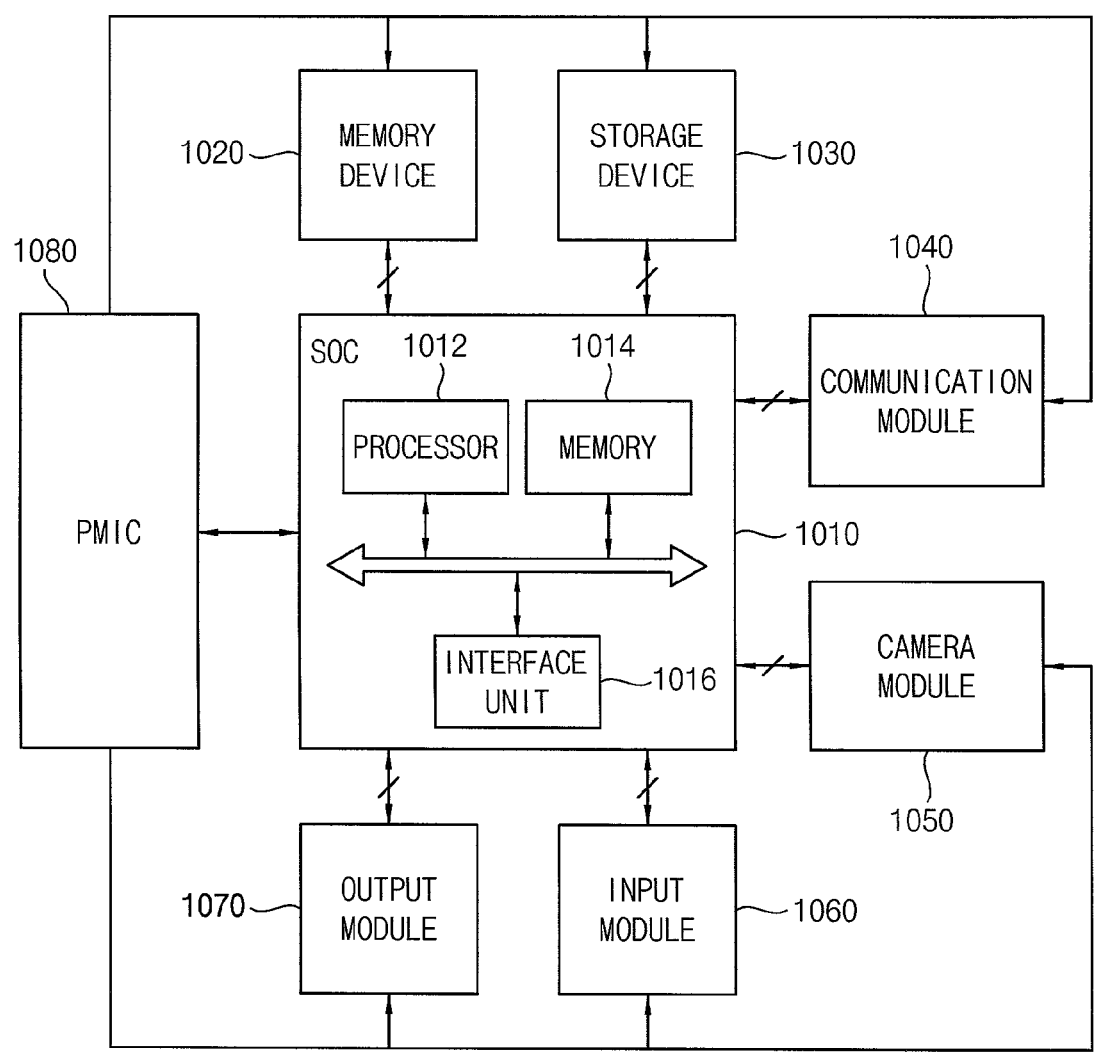
FIG. 20 is a block diagram illustrating a mobile system according to exemplary embodiments of the present invention.

FIG. 20 is a block diagram illustrating a mobile system according to exemplary embodiments of the present invention.

Referring to FIGS. 19 and 20, a mobile system 1000 includes an SOC 1010 and a plurality of functional modules 1040, 1050, 1060 and 1070. The mobile system 1000 may further include a memory device 1020, a storage device 1030 and a power management device 1080.

The SOC 1010 controls overall operations of the mobile system 1000. The SOC 1010 may be the SOC according to exemplary embodiments of the present invention and may operate based on the method of performing the secure communication according to exemplary embodiments of the present invention. Accordingly, pharming attacks may be efficiently prevented, the user's personal information may be efficiently protected, and the SOC 1010 and the mobile system 1000 may have increased security.

The memory device 1020 and the storage device 1030 may store data for the operations of the mobile system 1000. The plurality of functional modules 1040, 1050, 1060 and 1070 are controlled by the SOC 1010 and perform various functions of the mobile system 1000. For example, the mobile system 1000 may include a communication module 1040, a camera module 1050, an input module 1060, an output module 1070, etc. The power management device 1080 may provide an operating voltage to the SOC 1010, the memory device 1020, the storage device 1030 and the functional modules 1040, 1050, 1060 and 1070.

In some exemplary embodiments of the present invention, the input module 1060 may include at least one input device such as a keyboard, a keypad, a touch screen, a touch pen, a button, a microphone, an analog stick, etc. The mobile system 1000 may receive the access information CI in FIG. 2 based on the user's handling with respect to the input device.

The present disclosure may be applied to various devices and systems that perform the secure communication. For example, the present disclosure may be applied to systems such as be a mobile phone, a smart phone, a PDA, a PMP, a digital camera, a camcorder, a PC, a server computer, a workstation, a laptop computer, a digital TV, a set-top box, a portable game console, a navigation system, etc.

The foregoing is illustrative of exemplary embodiments of the present invention and is not to be construed as limiting thereof. Although a few exemplary embodiments of the present invention have been described, those skilled in the art will readily appreciate that many modifications are possible without materially departing from the novel teachings and aspects of the present disclosure.

What is claimed is:

1. A method of performing secure communication in a mobile system, the method comprising:
  receiving access information for a target site, while the mobile system is in a normal mode;
  changing an operational mode of the mobile system from the normal mode to a secure mode based on the received access information;
  generating an internet protocol (IP) packet corresponding to the access information;
  resolving an IP address of the access information using an external domain name system (DNS) server;
  verifying the access information while the mobile system is in the secure mode including comparing the resolved IP address to an IP address of the generated IP packet; and
  selectively accessing the target site based on a result of the verification.

2. The method of claim 1, wherein verifying the access information includes:
  comparing the resolved IP address to the IP address of the generated IP packet and verifying a first port number included in the access information.

3. The method of claim 2, wherein the resolved IP address is stored in a first list.

4. The method of claim 3, wherein the first list is stored in a secure storage region of the mobile system.

5. The method of claim 1, wherein the IP address is resolved based on a port number of the access information.

6. The method of claim 1, wherein verifying the access information further includes:
  generating a warning to warn against accessing the target site.

7. The method of claim 6, wherein verifying the access information further includes:
  checking whether the target site is a known site,
  wherein when the target site is an unknown site, displaying a pop-up window to inquiry whether the access to the target site is to be continued.

8. The method of claim 6, wherein verifying the access information further includes:
  checking whether the access to the target site corresponds to a predetermined first access pattern,
  wherein when the access to the target site does not correspond to the first access pattern, displaying a pop-up window to inquiry whether the access to the target site is to be continued.

9. The method of claim 8, wherein the first access pattern is stored in a secure storage region of the mobile system.

10. The method of claim 1, wherein selectively accessing the target site includes:
  accessing the target site when the verification has succeeded; and
  blocking access to the target site when the verification has failed.

11. The method of claim 10, wherein when the verification has failed, the access information is discarded.

12. A method of performing secure communication in a mobile system, the method comprising:
  receiving access information for a target site, while the mobile system is in a normal mode;
  changing an operational mode of the mobile system from the normal mode to a secure mode based on the received access information;
  verifying the access information while the mobile system is in the secure mode; and
  selectively accessing the target site based on a result of the verification,
  wherein verifying the access information includes:
  performing a first service operation to verify validity of a first internet protocol (IP) address and a first port number included in the access information,
  wherein performing the first service operation includes:
  checking whether the first IP address and the first port number are included in a first list that stores information regarding authorized sites,
  wherein when the first IP address and the first port number are included in the list, it is determined that the first IP address and the first port number are valid, wherein performing the first service operation further includes:
checking whether the first IP address and the first port number are included in a second list that stores information regarding unauthorized sites, and
wherein when the first IP address and the first port number are included in the second list, it is determined that the first IP address and the first port number are invalid.

13. A method of performing secure communication in a mobile system, the method comprising:
receiving access information for a target site, while the mobile system is in a normal mode;
changing an operational mode of the mobile system from the normal mode to a secure mode based on the received access information;
verifying the access information while the mobile system is in the secure mode; and
selectively accessing the target site based on a result of the verification,
wherein verifying the access information includes:
performing a first service operation to verify validity of a first internet protocol (IP) address and a first port number included in the access information,
wherein verifying the access information further includes:
selectively performing a second service operation to resolve the first IP address based on the first port number,
wherein selectively performing the second service operation includes:
checking whether the first port number corresponds to a reference port number for accessing an external domain name system (DNS) server, and
wherein when the first port number corresponds to the reference port number, a second IP address is obtained from the external DNS server.

14. A system-on-chip (SOC) comprising:
a processor core;
a memory accessible to the processor core; and
an interface unit connected to the processor core,
wherein the memory stores instructions, executable by the processor core, to:
change an operational mode of the SOC from a normal mode to a secure mode, based on access information received for a target site, when the SOC is in the normal mode,
verify the access information while the SOC is in the secure mode, and
selectively access the target site based on a result of the verification,
wherein the interface unit is configured to allow or deny access to the target site, and
wherein verifying the access information includes:
verifying validity of a first internet protocol (IP) address and a first port number included in the access information;
checking whether the first port number corresponds to a reference port number for accessing an external domain name system (DNS) server; and
obtaining a second IP address from the DNS server when the first port number corresponds to the reference port number.

15. The SOC of claim 14, wherein the instructions include first instructions to:
perform a first service operation to verify the validity of the first internet protocol (IP) address and the first port number included in the access information.

16. The SOC of claim 15, wherein the instructions further include second instructions to:
selectively perform a second service operation to resolve the first IP address based on the first port number.

17. The SOC of claim 16, wherein the instructions further include third instructions to:
selectively perform a third service operation to generate a warning to warn against accessing the target site.

18. The SOC of claim 14, wherein when the verification has succeeded, the interface unit allows access the target site,
wherein when the verification has failed, the interface unit denies access to the target site.

19. The SOC of claim 14, wherein the interface unit includes:
a first interface unit configured to control access to the target site by connecting an external WiFi module with the SOC; and
a second interface unit configured to control access to the target site by connecting an external communication processor with the SOC.

20. A mobile system comprising:
a system-on-chip (SOC);
a plurality of functional modules controlled by the SOC, the SOC comprising:
a processor core;
a memory accessible to the processor core; and
an interface unit connected to the processor core,
wherein the memory stores instructions, executable by the processor core, to:
change an operational mode of the SOC from a normal mode to a secure mode based on access information received for a target site, when the SOC is in the normal mode,
verify the access information while the SOC is in the secure mode, and
selectively access the target site based on a result of the verification,
wherein the interface unit is configured to allow or deny access to the target site,
wherein verifying the access information includes:
verifying validity of a first internet protocol (IP) address and a first port number included in the access information;
checking whether the first port number corresponds to a reference port number for accessing an external domain name system (DNS) server; and
obtaining a second IP address from the DNS server when the first port number corresponds to the reference port number.

* * * * *